US008729828B2

(12) United States Patent
Wang et al.

(10) Patent No.: US 8,729,828 B2
(45) Date of Patent: May 20, 2014

(54) INTEGRATED CIRCUIT CONTROLLER FOR BALLAST

(75) Inventors: Gwo-Hwa Wang, Taipei (TW); Jea-Sen Lin, Taipei County (TW); Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/763,728

(22) Filed: Jun. 15, 2007

(65) Prior Publication Data

US 2008/0309256 A1 Dec. 18, 2008

(51) Int. Cl.
*H05B 37/02* (2006.01)

(52) U.S. Cl.
USPC ............................ 315/307; 315/309; 315/360

(58) Field of Classification Search
USPC .............. 315/209 R, 224, 291, 307–309, 360
See application file for complete search history.

(56) References Cited

U.S. PATENT DOCUMENTS

| | | | | |
|---|---|---|---|---|
| 5,739,645 A * | 4/1998 | Xia et al. | | 315/307 |
| 5,825,138 A * | 10/1998 | Diazzi et al. | | 315/294 |
| 5,939,834 A * | 8/1999 | Nerone | | 315/209 R |
| 5,945,788 A * | 8/1999 | Li et al. | | 315/308 |
| 5,969,483 A * | 10/1999 | Li et al. | | 315/225 |
| 6,008,593 A * | 12/1999 | Ribarich | | 315/307 |
| 6,140,779 A * | 10/2000 | Kanazawa et al. | | 315/291 |
| 6,285,138 B1 * | 9/2001 | Kataoka et al. | | 315/291 |
| 6,400,095 B1 * | 6/2002 | Primisser et al. | | 315/224 |
| 6,498,437 B1 * | 12/2002 | Chang et al. | | 315/141 |
| 6,661,185 B2 * | 12/2003 | Kominami et al. | | 315/291 |
| 6,822,401 B2 * | 11/2004 | Borella et al. | | 315/291 |
| 6,956,336 B2 * | 10/2005 | Ribarich | | 315/247 |
| 7,348,734 B2 * | 3/2008 | Yadlapalli | | 315/224 |
| 7,642,735 B2 * | 1/2010 | Gulsen et al. | | 315/360 |
| 2003/0006720 A1 * | 1/2003 | Borella et al. | | 315/291 |
| 2005/0047176 A1 * | 3/2005 | Fukumoto | | 363/17 |
| 2007/0090775 A1 * | 4/2007 | Ribarich | | 315/291 |
| 2008/0042595 A1 * | 2/2008 | Ribarich | | 315/291 |

* cited by examiner

*Primary Examiner* — Tung X Le (74) *Attorney, Agent, or Firm* — Rosenberg, Klein & Lee (57) ABSTRACT

The present invention provides an integrated circuit controller for ballast with preheat/repreheat filament and ignition time control. A charge/discharge circuit is connected to a capacitor to provide the charge/discharge path for the capacitor. It charges when integrated circuit controller without errors and discharges when error occurred during lamp operation or power tripped. A control circuit is coupled to the charge/discharge circuit to control the charge/discharge circuit to charge or discharge the capacitor. A compare circuit is coupled to the charge/discharge circuit to compare a voltage signal on the capacitor from the charge/discharge circuit with threshold voltages for timing control and providing a preheat signal and an ignition signal. A control logic circuit is coupled to the control circuit to control the control circuit and coupled to the compare circuit to receive the preheat signal and the ignition signal for preheating the filament and igniting the lamp. The control logic circuit further receives a feedback voltage for over voltage protect. Once the feedback voltage is over its threshold voltage in the control logic circuit, the control logic circuit controls the control circuit for discharging the capacitor.

26 Claims, 8 Drawing Sheets

INTEGRATED CIRCUIT CONTROLLER FOR BALLAST

FIELD OF INVENTION

The present invention relates in general to ballast, and more particularly, to ballast of fluorescent or compact fluorescent lamps with preheating/repreheating filament and ignition time control with just using one extra capacitor and adjustable operation frequency/OVP by voltage feedback.

BACKGROUND OF THE INVENTION

Fluorescent lamps are the most popular light sources in our life. Improving the efficiency of the fluorescent lamps will significantly save energy. In recent development, how to improve the efficiency and save the power for the ballast of the fluorescent lamp is the major concern, and further preheating filament before lamp ignition will help filament generate free electronics more easily and this can not only reduce ignition voltage between two ends of cathodes but also improve the lifetime of the lamps. Therefore many electronic ballasts or integrated circuit controllers are added preheating filament function for better lifetime of lamps, but this still brings out another problem "repreheat". Repreheat means preheat the filament more than once during a short time of power tripped for ballast, because during this time the filament is still at high temperature around 1000° K and the short time of power tripped will let ballast reset its function and repreheat the filament again, this will gives two times of energy for filament and occur over preheat. Over preheat will reduce the lifetime of lamps and it should be prevent such situation happen.

Filament with perfect preheating will reduce the ignition voltage at two ends of cathodes and ignition time. Meanwhile if ignition time takes too long to ignite the lamp and high lamp voltage occurred during this time, it will also influence the lifetime of lamps, so it should also avoid.

With preheating filament function, most of conventional electronic ballasts are paralleled one capacitor as a starting capacitor to the lamp to achieve preheat filament before lamp ignition. But glow current is occurred during lamp preheating because the voltage drop between the capacitor and this will reduce the lifetime of lamps.

Figure 1:
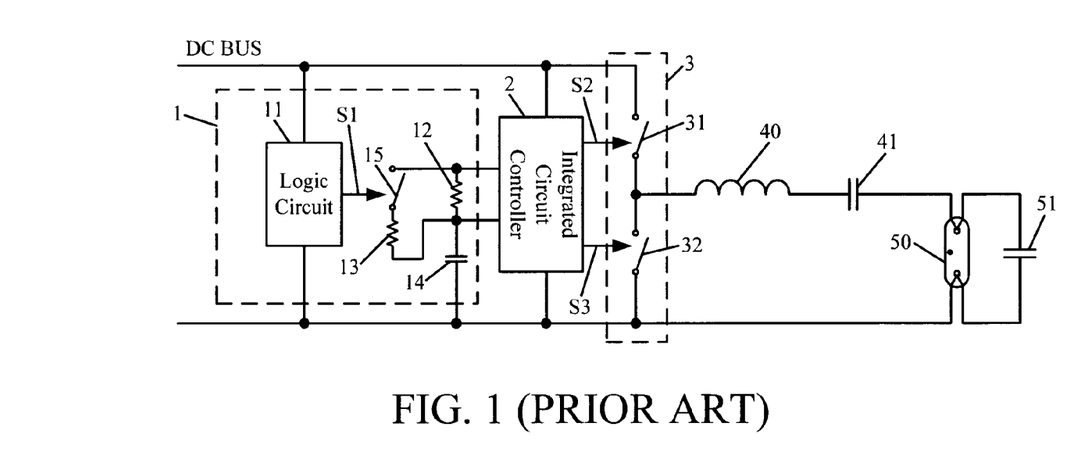
FIG. 1 shows a circuit diagram of first conventional electronic ballast.

FIG. 1 shows first conventional series resonant circuit of electronic ballast with preheating filament function using an integrated circuit controller 2. A half-bridge inverter 3 consists of two switches 31 and 32 that controlled by signals S2 and S3 from the integrated circuit controller 2. These two switches 31 and 32 are complementarily switched on and off with about 50% duty cycle at the desires switching frequency controlled by a resistor 12 and a capacitor 14. The resonant circuit is composed of an inductor 40, a capacitor 41 and a fluorescent lamp 50. The fluorescent lamp 50 is in paralleled with a capacitor 51. The capacitor 51 is operated as a starting capacitor. A preheat circuit 1 consists of a logic circuit 11, the resistor 12, the capacitor 14, and a switch 15 connected in series with a resistor 13 paralleled to the resistor 12. The preheat function is done by controlling the switch 15 to parallel the resistor 13 with the resistor 12 for higher frequency switching when a switching signal S1 appears. Preheat time is controlled by the logic circuit 11 before lamp ignition. High starting frequency is to avoid stress on the lamp filament at startup and reduce the ignition voltage on lamps.

In this topology when the DC bus voltage tripped or user switching the power switch in a short time during the lamp operation will let the integrated circuit controller 2 and the preheat circuit 1 to fail its function and repreheat the filament again. Therefore gives filament two times of energy for preheating and this should be avoid. Meanwhile ignition time does not control in this case. If ignition time takes too long to ignite the lamp 50 means will have a higher voltage drop between two ends of cathodes at the same time, this will damage the filament and reduce the lifetime for lamps. It should be also prevent.

Figure 2:
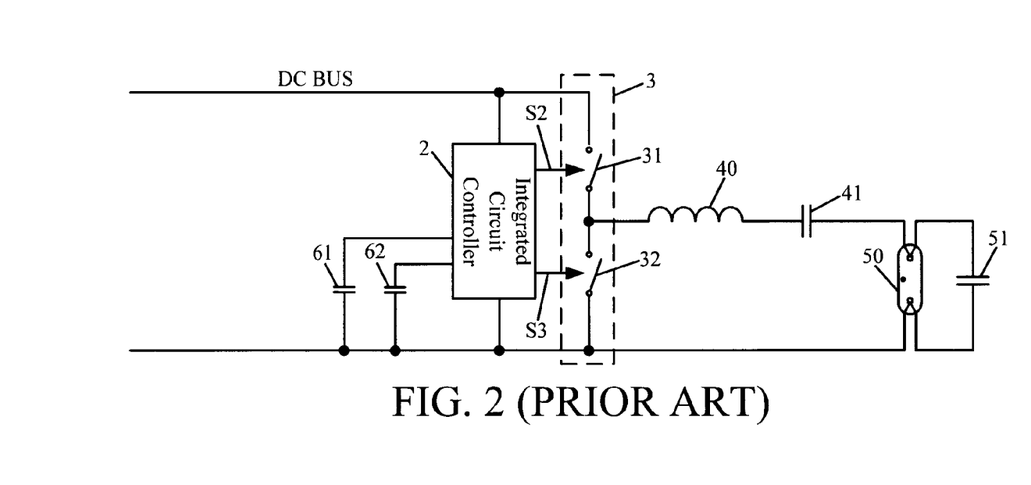
FIG. 2 shows a circuit diagram of second conventional electronic ballast.

Another conventional electronic ballast with preheat function is showed in FIG. 2. A capacitor 61 is coupled to the integrated circuit controller 2 for preheat time control, a capacitor 62 is coupled to the integrated circuit controller 2 for ignition time control. In this case it has to use two extra capacitors for preheating and ignition time control.

The objective of the present invention is to provide ballast with repreheating and ignition time control and necessary signals by using one capacitor. Another objective of the present invention is to develop a low cost circuit for high efficiency performance.

SUMMARY OF THE INVENTION

The object of the present invention is to provide an integrated circuit controller for ballast. A power circuit is coupled to the power rectifier to provide power source that needed inside the logic circuits or control circuits of the integrated circuit controller. A charge/discharge circuit is connected to a capacitor to provide the charge or discharge path for the capacitor and coupled to a control circuit and a compare circuit. It charges when the integrated circuit controller without errors and discharges when error occurred during lamp operation or power tripped. The control circuit controls the charge/discharge circuit. The compare circuit is coupled to the charge/discharge circuit and a control logic circuit to compare the signal from the charge/discharge circuit and provide signals for control logic circuit to determine maximum or minimum switch frequency and for control circuit to control the timing to charge or discharge the capacitor. The control logic circuit and a frequency compensation circuit are connected together to a feedback control circuit to receive the lamp voltage. The control logic circuit is coupled to the compare circuit, the frequency compensation circuit, the control circuit and an oscillator circuit. An over voltage protect will occurred once the lamp voltage over its threshold voltage in the control logic circuit and discharge the capacitor through the control circuit.

The frequency compensation circuit is coupled to the control logic circuit and the oscillator circuit. Switching frequency of the integrated circuit controller can also set by the frequency compensation circuit according to the threshold voltage in the frequency compensation circuit and the voltage of the feedback control circuit. The switching frequency is increased in response to the increase of the voltage of the feedback control circuit, and the switching frequency is decrease in response to the decrease of the voltage of the feedback control circuit. The oscillator circuit is coupled to the control logic circuit, the frequency compensation circuit, a driver circuit and an adaptive zero voltage switch circuit. The oscillator circuit has internal maximum and minimum switching frequency limit and provides the maximum or minimum switching frequency for a half bridge inverter of the ballast. The switching frequency can be changed by the frequency compensation circuit or the adaptive zero voltage switch once the feedback voltage of the feedback control circuit changes or non zero voltage switch occurred during lamp operation. The adaptive zero voltage switch circuit is coupled to the oscillator circuit and the half bridge inverter.

The switching frequency is increased in response to non zero voltage switch occurred or the increase of the voltage of the feedback control circuit, and the switching frequency is decreased in response to the decrease of the voltage of the feedback control circuit. The driver circuit is coupled to the oscillator circuit and connected to the switches of the half bridge inverter and a capacitor that provides the switching energy needed for switching the switches.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings.

DESCRIPTION OF THE PREFERRED EMBODIMENT

Figure 3:
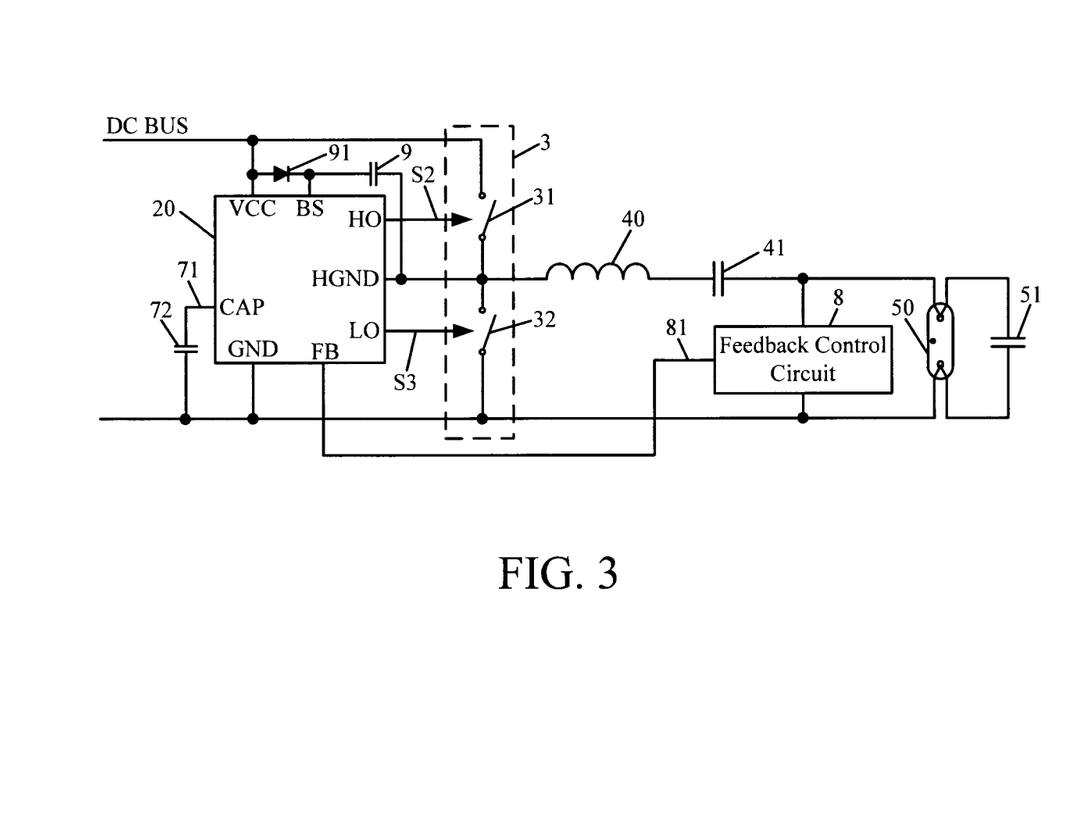
FIG. 3 shows a circuit diagram of ballast according to present invention.

FIG. 3 shows the schematic of a ballast according to present invention. A lamp 50, an inductor 40 and a capacitor 41 are connected in series to develop a resonant circuit, a capacitor 51 is paralleled with the lamp 50 as a starting capacitor. The lamp 50 can be the fluorescent lamp. The resonant circuit will generate a sine wave voltage to operate the fluorescent lamps. A switch 31 is connected in series with a switch 32 to form a half bridge inverter 3 coupled to the resonant circuit. The switch 31 is a high-side switch and connected to an input voltage DC BUS of the power converter and controlled by an integrated circuit controller 20 via a terminal HO when a switching signal S2 appears. The switch 32 is a low-side switch and connected to the ground and controlled by the integrated circuit controller 20 via a terminal LO when a switching signal S3 appears.

A feedback terminal FB of the integrated circuit controller 20 is connected to a feedback control circuit 8 to receive a feedback signal 81 for regulating the switching frequency and over voltage protect during lamp operation. The feedback control circuit 8 is coupled to the capacitor 41, the lamp 50 and the ground to provide the feedback signal 81 via the feedback terminal FB. The feedback signal 81 indicates the lamp voltage. A diode 91 and a capacitor 9 form a charge-pump circuit and connected to a bootstrap terminal BS of the integrated circuit controller 20 and a bootstrap-ground terminal HGND of the integrated circuit controller 20 for providing a switching energy that needed for a driver circuit 28 (shown in FIG. 4) for the high-side switch 31. A capacitor 72 is connected to a terminal CAP and a terminal GND to provide a voltage signal 71 for internal logic circuit of the integrated circuit controller 20. The terminal GND is coupled to the ground to provide a current return for the integrated circuit controller 20 and all signals should respect to the terminal GND. A supply terminal VCC of the integrated circuit controller 20 is coupled to the input voltage DC BUS to provide the power source that needed for integrated circuit controller 20.

Figure 4:
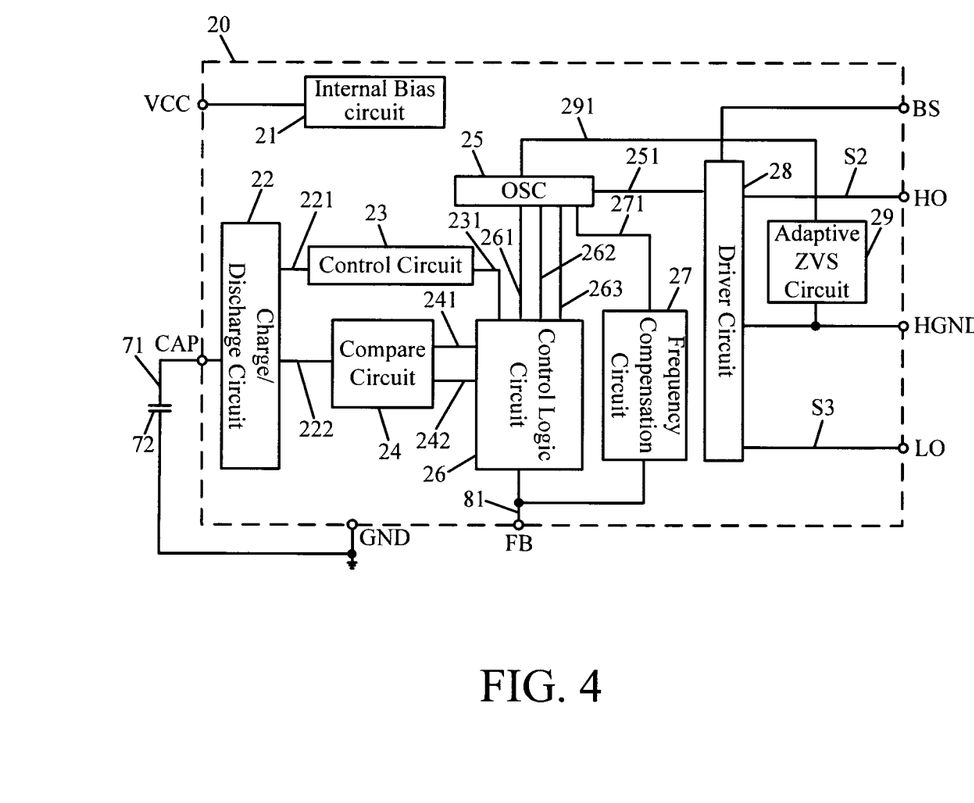
FIG. 4 shows a circuit diagram of a first preferred embodiment of an integrated circuit controller for ballast according to present invention.

FIG. 4 is a first preferred embodiment of the integrated circuit controller 20 for ballast according to present invention. An internal bias circuit 21 is coupled to the supply terminal VCC to provide a necessary power source and a reference voltage that needed for the integrated circuit controller 20. A charge/discharge circuit 22 is coupled to the terminal CAP to provide charge and discharge path for the capacitor 72 to achieve preheat, ignition, run time and repreheat function. The best preheat filament condition is the ratio of resistance between room temperature and working temperature which gives by, $$\frac{Th}{Tc} = \left[\frac{Rh}{Rc}\right]^{0.814} \quad (1)$$

Where Th is working temperature of the filament, Tc is room temperature or reference temperature, Rc is the resistance at room temperature or reference temperature of the filament and Rh is the resistance at working temperature of the filament. The best preheat condition is that the coefficient between 4-6.

Repreheat function is to preheat the filament again when power tripped in a short time and power returned. During this time the filament its temperature still at working temperature around 1000° K. The short time of power trip was not able to decrease the temperature of the filament to room temperature, so if integrated circuit controller does preheat function again will give two times of energy for filament and influence the life time of lamps. The relationship between filament temperature and resistance which gives by, $$Rt = Rc[1+\alpha(Th-Tc)+\beta(Th-Tc)^2] \quad (2)$$

Where Rt is the filament resistance at t temperature, Rc is the filament resistance at room temperature or reference temperature, α is the resistance temperature coefficient, Tc is room temperature or reference temperature, β is the expansion coefficient and Th is working temperature. For metal conductors that β can be ignored, so the equation can be rewrite, $$Rt = Rc[1+\alpha(Th-Tc)] \quad (3)$$

Hence for filament, the resistance increases in response to the increase of the working temperature Th and decreases in response to the decrease of the working temperature Th. Therefore if controlling the discharge slope of the capacitor 72 to mach the slop of the decrease of the filament temperature, so we can control the repreheat time and give a suitable energy for filament to avoid over preheat when power tripped in a sort time.

The capacitor 72 is controlled by the charge/discharge circuit 22. A signal 221 appears from a control circuit 23 to control the charge/discharge circuit 22 to charge or discharge the capacitor 72 when the integrated circuit controller 20 without errors or any fault signal trigged. The charge/discharge circuit 22 is coupled to a compare circuit 24 and the control circuit 23 and connected to the capacitor 72 via the terminal CAP. The capacitor 72 charges when the integrated circuit controller 20 without errors and the voltage on the capacitor 72 will gradually increase. The capacitor 72 discharges when any fault signal trigged or power tripped and the voltage on the capacitor 72 will gradually decrease with a slope which is similar to the decrease of the filament temperature.

The compare circuit 24 is coupled between the charge/discharge circuit 22 and a control logic circuit 26. The compare circuit 24 receives a voltage signal 222 from the charge/discharge circuit 22 to decide the time for preheating and ignition mode according to a threshold voltage in the compare circuit 24 and the voltage on the capacitor 72. Once the capacitor 72 has been charged by the charge/discharge circuit 22 the voltage signal 71 will gradually increase, and the voltage signal 222 is the same as the voltage signal 71.

When the voltage signal 222 lower than a first threshold voltage (Vprh) the compare circuit 24 will generate a preheat signal 241 (PRH) to the control logic circuit 26 to control the oscillator circuit 25 (OSC) for generating an oscillation signal 251 with a maximum frequency (fmax) to control a driver circuit 28 for the half bridge inverter 3 (shown in FIG. 3). The oscillation signal 251 determines the switching frequency of the integrated circuit controller 20 for the ballast. The integrated circuit controller 20 is in a PREHEAT mode once the preheat signal 241 appears. The preheat signal 241 can be "low" when the voltage signal 222 lower than the first threshold voltage (Vprh) and "high" when the voltage signal 222 higher than the first threshold voltage (Vprh).

When the voltage signal 222 continuously increases over the first threshold voltage (Vprh) and lower than a second threshold voltage (Vign) the compare circuit 24 will generate an ignition signal 242 (IGN) to the control logic circuit 26 to control the oscillator circuit 25 (OSC), and the oscillator circuit 25 will gradually decrease the frequency until a minimum frequency (fmin) that limit by the integrated circuit controller 20. The integrated circuit controller 20 is in IGNITION mode and lamp must finish ignite once the ignition signal 242 appears. If lamp is frailer to ignite when the ignition signal 242 appears or lamp ignition takes too long after the ignition signal 242 disappears the integrated circuit controller 20 will into a fault mode for a failure ignition protect. The ignition signal 242 can be "low" when the voltage signal 222 between the first and the second threshold voltage and "high" when the voltage signal 222 higher than the second threshold voltage (Vign). When the voltage signal 222 higher than the second threshold voltage (Vign) and the disappearance of the ignition signal 242, the integrated circuit controller 20 is in a RUN mode and the frequency is at the minimum frequency (fmin). The first threshold voltage (Vprh) is lower than the second threshold voltage (Vign) and the minimum frequency (fmin) is lower than the maximum frequency (fmax).

The control logic circuit 26 and a frequency compensation circuit 27 are connected to the feedback control circuit 8 (shown in FIG. 3) via the feedback terminal FB to receive the feedback signal 81 from the feedback control circuit 8. The control logic circuit 26 is also coupled to the compare circuit 24, the control circuit 23 and the oscillator circuit 25. Once the preheat signal 241 appears from the compare circuit 24, the control logic circuit 26 will generate a maximum frequency signal 261 for the oscillator circuit 25 to switch the half bridge inverter 3 (shown in FIG. 3) at maximum frequency through the driver circuit 28. When the ignition signal 242 appears from the compare circuit 24, the control logic 26 will generate a frequency sweep signal 262 for the oscillator circuit 25 to gradually decrease the switching frequency until the minimum frequency. When the feedback signal 81 higher than a third threshold voltage (V3) in the control logic circuit 26 will occur an over voltage protect and the control logic 26 will generate an OVP signal 263 and a control signal 231 for disabling the oscillator circuit 25 and discharging the capacitor 72 through the charge/discharge circuit 22 which controlled by the control circuit 23. The oscillator circuit 25 generates the oscillation signal 251 with a maximum frequency limit and a minimum frequency limit to control the driver circuit 28 in response to the maximum frequency signal 261 and the frequency sweep signal 262 respectively.

The frequency compensation circuit 27 is coupled to the control logic 26 and the oscillator circuit 25. The feedback signal 81 into the frequency compensation circuit 27 will be divided for within a fourth (V4) and a fifth (V5) threshold voltages. The fourth (V4) and the fifth (V5) threshold voltages are the low threshold voltage and the high threshold voltage respectively. The frequency compensation circuit 27 generates a signal 271 for the oscillator circuit 25 to adjust the switching frequency. The oscillator circuit 25 generates the oscillation signal 251 to control the driver circuit 28 in response to the signal 271. The switching frequency increases in response to the increase of the feedback signal 81 with the maximum frequency (fmax), and the switching frequency decreases in response to the decrease of the feedback signal 81 with the minimum frequency (fmin). The third threshold voltage (V3) is larger than the fourth (V4) and the fifth (V5) threshold voltages. The fourth threshold voltage (V4) is lower than the fifth threshold voltage (V5).

The driver circuit 28 is coupled to the oscillator circuit 25 and provides the high side and low side driver for the half bridge inverter 3 (shown in FIG. 3) and switching energy needed for high side. The driver circuit 28 receives the oscillation signal 251 to generate the switching signals S2 and S3 for controlling the switches 31 and 32 (shown in FIG. 3) via the terminals HO and LO respectively. The capacitor 9 (shown in FIG. 3) is connected to the driver circuit 28 via the terminal BS and the terminal HGND to provide the energy that needed for the high side switch 31 (shown in FIG. 3).

An adaptive zero voltage switch (ZVS) circuit 29 is coupled to the switches 31, 32 (shown in FIG. 3) of the half bridge inverter 3 through the terminal HGND to detect a non zero voltage switch if non zero voltage switch occurred during lamp operation. The non zero voltage switch means that the voltage on the switches 31, 32 of the half bridge inverter 3 (shown in FIG. 3) is not zero when the low-side switch 32 turned on. Therefore, the adaptive zero voltage switch circuit 29 is coupled to the half bridge inverter 3 to detect the voltage coupled to the high-side switch 31 and the low-side switch 32 when the low-side switch 32 turned on. Once non zero voltage switch occurred the adaptive zero voltage switch circuit 29 will generate a non-ZVS signal 291 to the oscillator circuit 25 to control the oscillator circuit 25 for increasing the switching frequency until return to ZVS.

Figure 5:
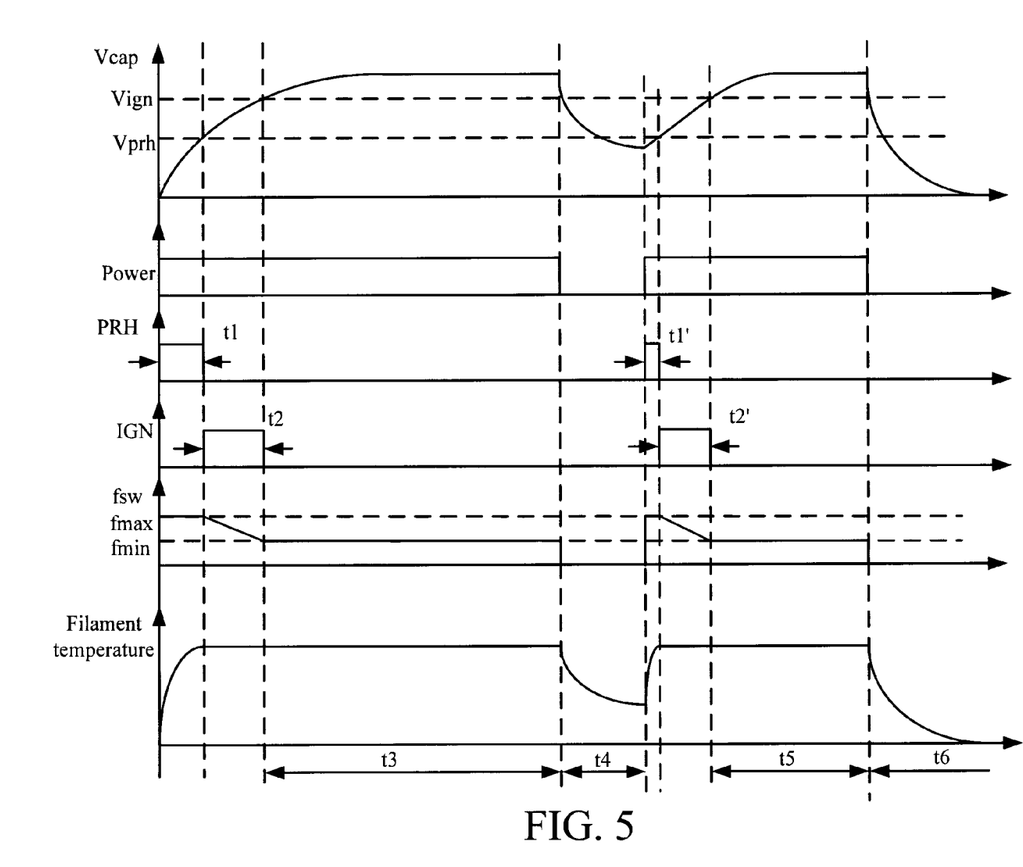
FIG. 5 shows the waveforms of the integrated circuit controller for ballast according to present invention.

FIG. 5 shows the waveforms of the integrated circuit controller 20 (shown in FIG. 4) for ballast according to present invention that discussed above. Vcap is the voltage on the capacitor 72 (shown in FIG. 4), power is the power signal when power on, PRH is the preheat signal 241 (shown in FIG. 4), IGN is the ignition signal 242 (shown in FIG. 4), fsw is the switching frequency and filament temperature is the temperature on filament during lamp operation. When power turned on, the charge/discharge circuit 22 (shown in FIG. 4) will charge the capacitor 72 and the voltage on the capacitor 72 will gradually increase. The compare circuit 24 will generate the preheat signal 241 (PRH) for PREHEAT mode and represent t1 for preheat time when the voltage (Vcap) is lower than the first threshold voltage (Vprh) in the compare circuit 24. The switching frequency is at maximum frequency (fmax) during the preheat time (t1) and the filament temperature will goes up to working temperature (Th).

The compare circuit 24 will generate the ignition signal 242 (IGN) for IGNITION mode and represent t2 for ignition time when the voltage (Vcap) continuously goes up and lower than the second threshold voltage (Vign) in the compare circuit 24. The switching frequency is sweeping down until minimum frequency (fmin) during the ignition time (t2). When the voltage (Vcap) higher the second threshold voltage (Vign) means lamp 50 (shown in FIG. 3) is in RUN mode during the run time (t3), during this time (t3) the switching frequency is at minimum frequency (fmin) unless non-zero voltage occurred.

When power tripped in a short time (t4). The filament temperature will decrease as same as the voltage on the capacitor 72 and the oscillator circuit 25 will be disabled. If the slop of the voltage discharge of the capacitor 72 is similar with the decrease of the filament temperature when power tripped, so we can realize the situation of the filament and control the repreheat time or reignition time after power returned according to the voltage on the capacitor 72. The time t1' and t2' are represented to repreheat time and reignition time respectively. The switching frequency is still at maximum frequency (fmax) during the repreheat time (t1') and sweeps down until minimum frequency (fmin) during the reignition time (t2'). When power is fully turned off in the time (t6), the voltage (Vcap) will discharged to zero for next lamp operation cycle.

Figure 6:
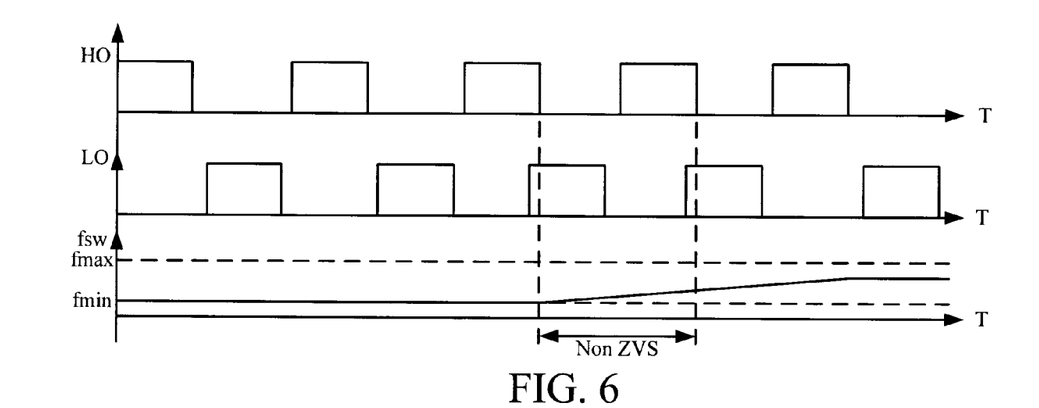
FIG. 6 shows the waveforms of the zero voltage switch according to present invention.

FIG. 6 shows the waveforms of the zero voltage switch according to present invention. If non-zero voltage switch occurred the adaptive zero voltage switch circuit 29 (shown in FIG. 4) will adjust the switching frequency until zero voltage switch return and keep the switching frequency.

Figure 7:
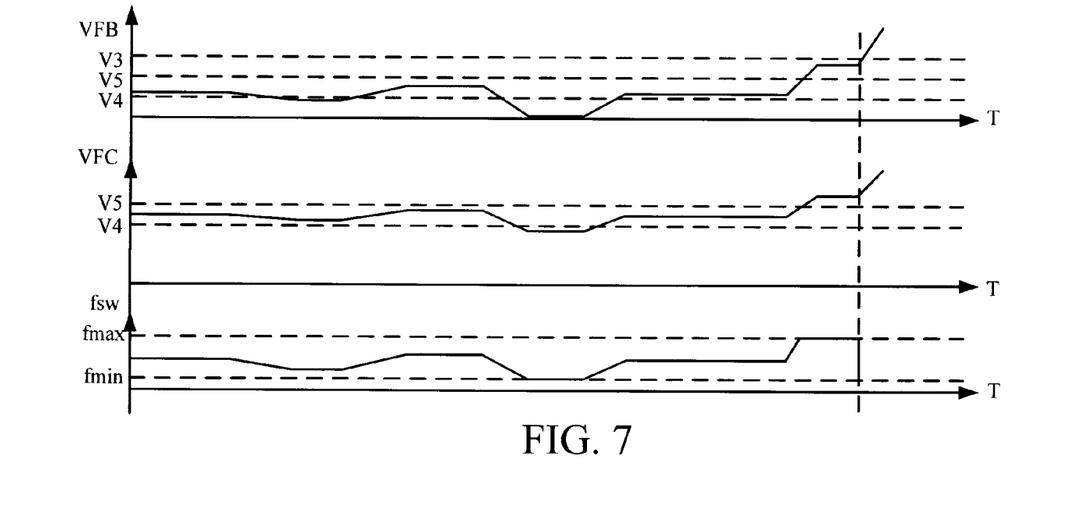
FIG. 7 shows the waveforms of the compare logic and frequency compensation according to present invention.

FIG. 7 shows the waveforms of the compare logic and frequency compensation according to present invention. VFB is the feedback voltage on the feedback terminal FB (shown in FIG. 4). The feedback voltage is the feedback signal 81 (shown in FIG. 4). VFC is the feedback voltage that divided in the frequency compensation circuit 27 (shown in FIG. 4). As just discussed above, the feedback terminal FB has two functions: over voltage protection and modify the switching frequency respectively for control logic circuit 26 (shown in FIG. 4) and frequency compensation circuit 27. Inside the feedback terminal FB has three threshold voltages, one (V3) is in the control logic circuit 26 for over voltage protect, the others (V4 and V5) are in the frequency compensation circuit 27 for modify and set the switching frequency.

Once the feedback signal 81 over the third threshold voltage (V3) in the control logic circuit 26 will occur the over voltage protect and the integrated circuit controller 20 (shown in FIG. 3) will into the fault mode. The feedback signal 81 into the frequency compensation circuit 27 will be divided within the fourth threshold voltage (V4) and the fifth threshold voltage (V5) for switching frequency compensation. Switching frequency can also be set by the frequency compensation circuit 27 according to the feedback voltage between the fourth threshold voltage (V4) and the fifth threshold voltage (V5) with the maximum and the minimum frequency limit inside the oscillator circuit 25.

Figure 8:
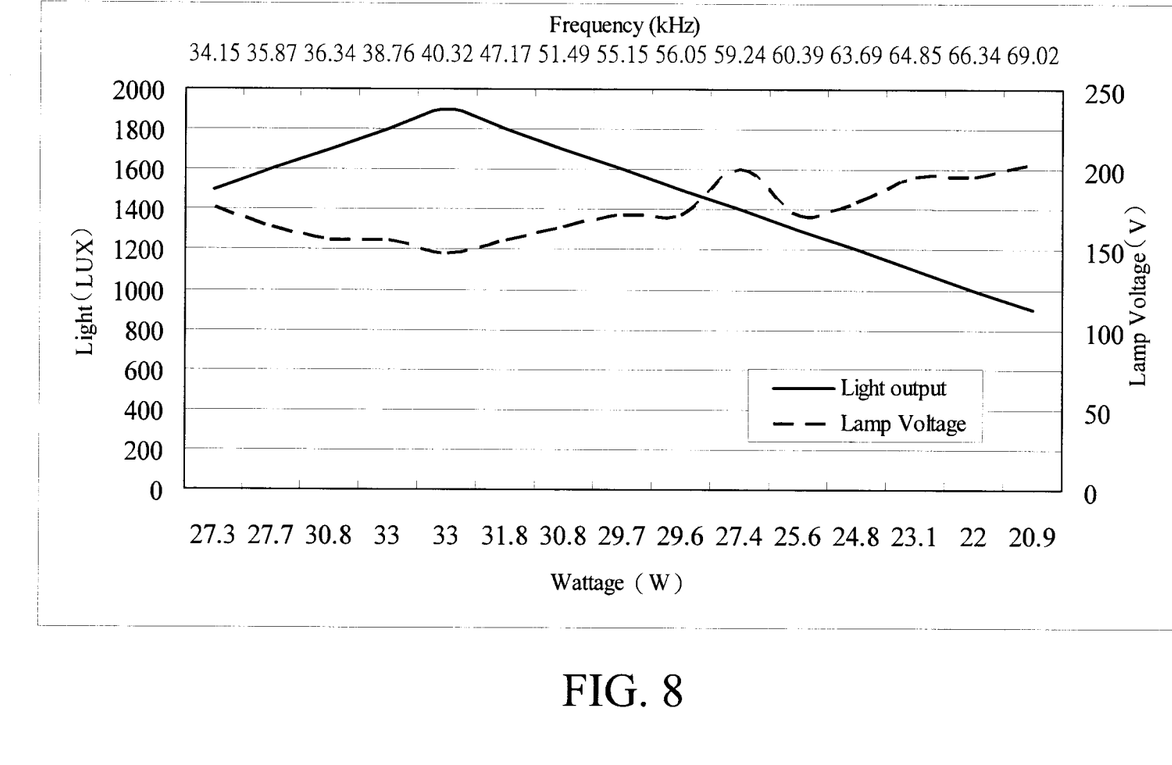
FIG. 8 shows the experiment result for ballast according to present invention.

FIG. 8 shows the experiment result for ballast according to present invention. The relationship of wattage output, light output and switching frequency were in bell shape which means that the light output and wattage output do not increase with the increase of the switching frequency and have a maximum value. Right side of the maximum value is a stable working area, resonant ballasts usually work at this area and left side of the maximum value is an unstable working area, ballasts should prevent work at this area because it is easily to eliminate the arc in the lamp 50 (shown in FIG. 3).

Figure 9:
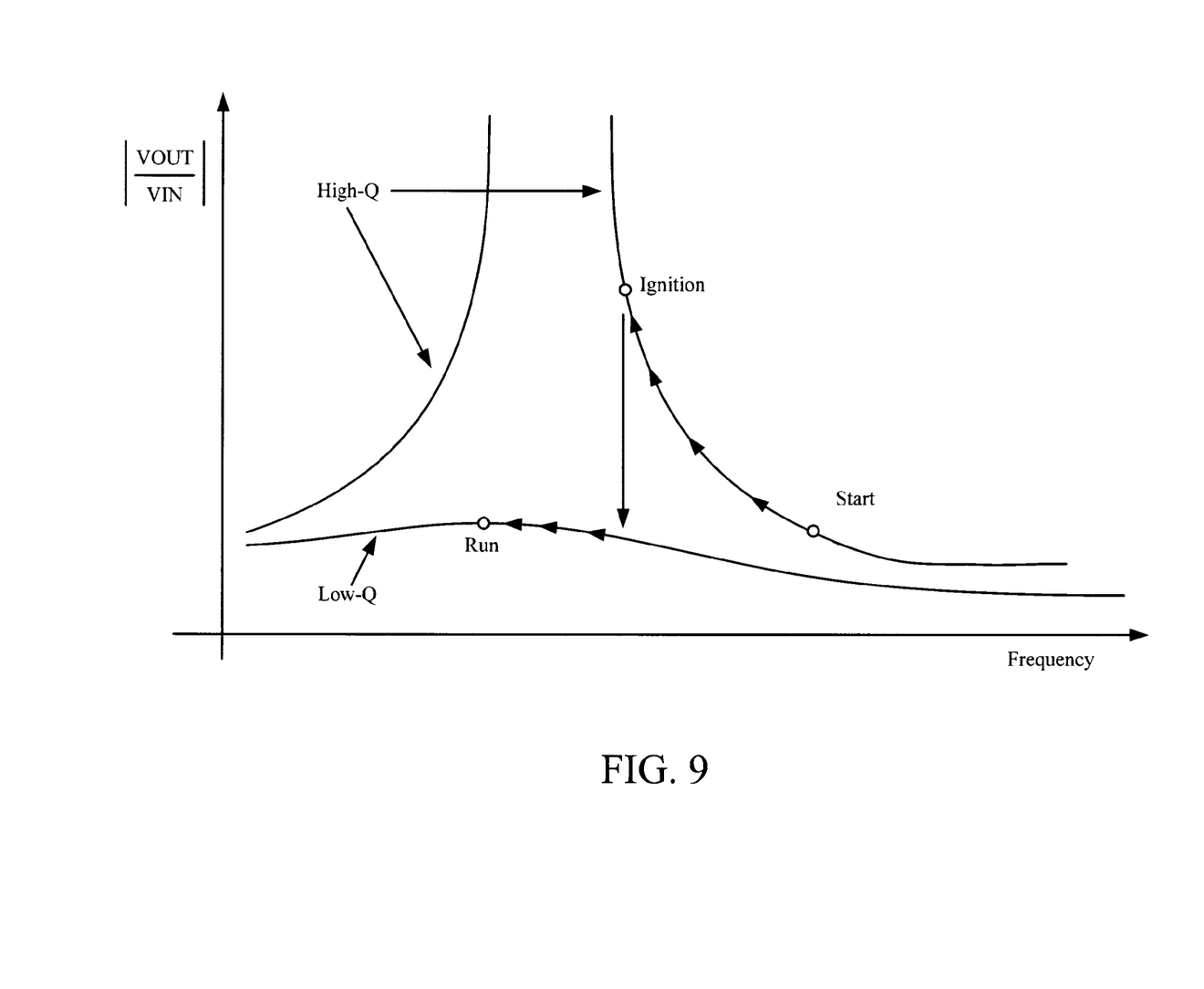
FIG. 9 shows the resonant tank bode plot with lamp operating points according to present invention.

FIG. 9 shows the resonant tank Bode plot with lamp operating points according to present invention. The switching frequency is started at higher frequency and gradually sweeps down until igniting the lamp, switching frequency must pass through the high-Q area of resonant circuit during frequency sweep for providing enough energy that needed for lamp ignition. After lamp ignition, the switching frequency sweeps to desire frequency and will let resonant circuit into low-Q area and stable the lamp arc.

Figure 10:
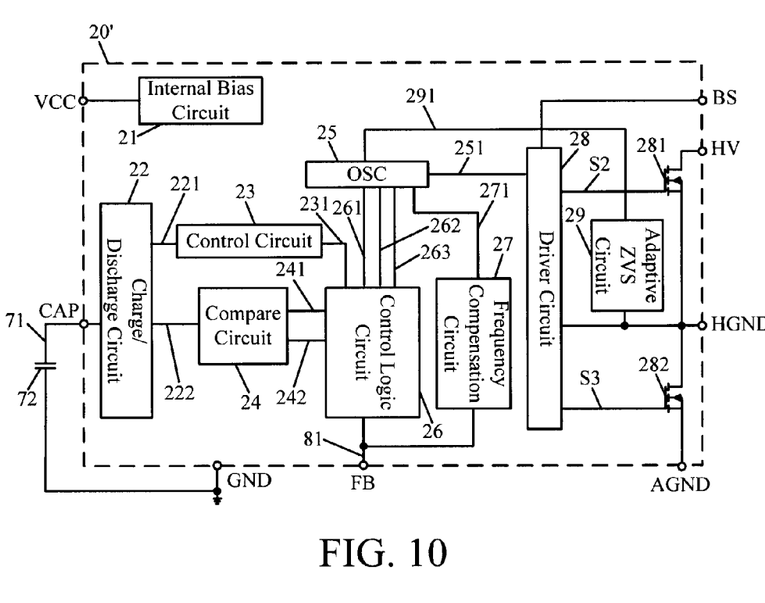
FIG. 10 shows a circuit diagram of a second preferred embodiment of the integrated circuit controller for ballast according to present invention.

FIG. 10 is a second preferred embodiment of the integrated circuit controller for ballast according to present invention. Most of the internal circuits of the integrated circuit controller 20' are the same as the first embodiment and no more description here, the main difference compared to the first embodiment is that the switches 31 and 32 in the first embodiment is implemented by MOSFETs 281 and 282 and installed in the integrated circuit controller 20'. The MOSFET 281 is coupled to a terminal HV coupled to the input voltage DC BUS (shown in FIG. 3), and the MOSFET 282 is coupled to a terminal AGND coupled to the ground. The MOSFETs 281 and 282 are connected in series and coupled to the driver circuit 28 for minimizing board area of the ballast.

Figure 11:
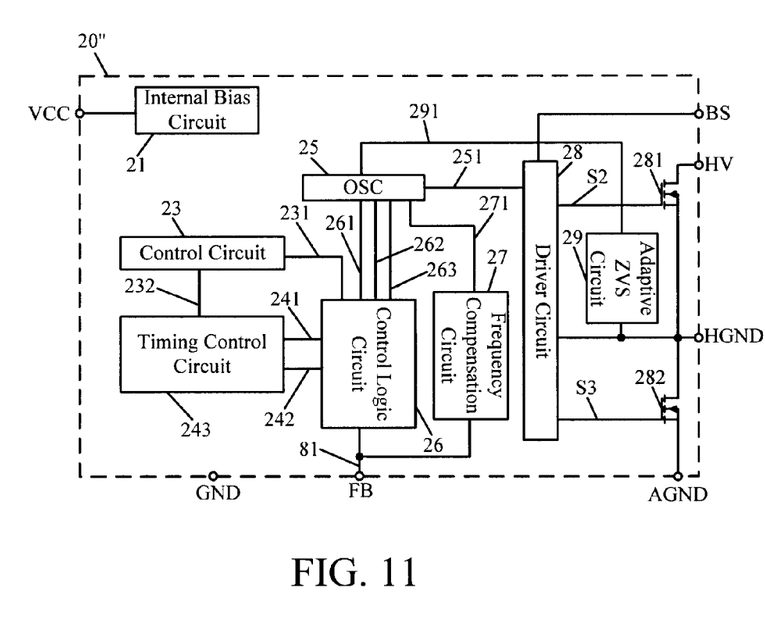
FIG. 11 shows a circuit diagram of a third preferred embodiment of the integrated circuit controller for ballast according to present invention.

FIG. 11 is a third preferred embodiment of integrated circuit for ballast according to present invention. Most of the internal circuits of the integrated circuit controller 20" are the same as the second embodiment and no more description here, the main difference compared to the second embodiment is that a timing control circuit 243 replaces the capacitor 72, the charge/discharge circuit 22 and the compare circuit 24 for preheat, ignition and run time control. Functions are same as discussed above according to present invention. The timing control circuit 243 has an internal preheat time t1 and ignition time t2 according to a timing/counter circuit (figure not shown) to provide the preheat signal 241 and the ignition signal 242 to the control logic 26 for preheat and ignition mode control.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An integrated circuit controller for the ballast, comprising:
   an oscillator circuit generating an oscillation signal;
   a driver circuit coupled to the oscillator circuit to receive the oscillation signal to control switches of the ballast, the oscillation signal determining a switching frequency of the integrated circuit controller for the ballast;
   a timing control unit generating a preheat signal for a preheat time control;
   a control circuit coupled to the timing control unit to control the timing control unit; and a control logic circuit connected to the control circuit to control the control circuit and coupled to the timing control unit to receive the preheat signal from the timing control unit, wherein the control logic circuit performs preheating of a filament of a lamp in response to the preheat signal and controlling the oscillator circuit.

2. The integrated circuit controller as claimed in claim 1, wherein the control logic circuit controls the oscillator circuit to generate the oscillation signal with a maximum frequency limit for controlling the switching frequency at a maximum frequency in response to the preheat signal.

3. The integrated circuit controller as claimed in claim 1, wherein the timing control unit disables the preheat signal and generates an ignition signal, and the control logic circuit receives the ignition signal for igniting the lamp.

4. The integrated circuit controller as claimed in claim 3, wherein the control logic circuit controls the oscillator circuit to generate the oscillation signal with a minimum frequency limit for sweeping down the switching frequency until a minimum frequency in response to the ignition signal.

5. The integrated circuit controller as claimed in claim 4, wherein the ignition signal is disabled and the switching frequency is at the minimum frequency.

6. The integrated circuit controller as claimed in claim 3, wherein once the lamp failure to ignite a failure ignition protect is acted after the ignition signal disappears.

7. The integrated circuit controller as claimed in claim 1, wherein the control logic circuit has a threshold voltage and receives a feedback signal from a feedback control circuit of the ballast for an over voltage protection, the control logic circuit disables the oscillator circuit once the feedback signal is higher than the threshold voltage of the control logic circuit.

8. The integrated circuit controller as claimed in claim 1, further comprising:
    a frequency compensation circuit having a low threshold voltage and a high threshold voltage and coupled to a feedback control circuit of the ballast to receive a feedback signal to control the oscillator circuit for determining the switching frequency and a frequency compensation according to the feedback signal and the low threshold voltage and the high threshold voltage.

9. The integrated circuit controller as claimed in claim 8, wherein the frequency compensation circuit divides the feedback signal for within the low threshold voltage and the high threshold voltage.

10. The integrated circuit controller as claimed in claim 1, further comprising:
    an adaptive zero voltage switch circuit coupled to the switches to detect the voltage on the switches when a low-side switch of the switches turned on, once the voltage on the switches being not zero and the low-side switch turned on the adaptive zero voltage switch circuit controlling the oscillator circuit to modify the switching frequency until the voltage on the switches being zero.

11. The integrated circuit controller as claimed in claim 10, wherein the adaptive zero voltage switch circuit detects the voltage which is coupled to a high-side switch and the low-side switch of the switches when the low-side switch turned on.

12. The integrated circuit controller as claimed in claim 10, wherein the adaptive zero voltage switch circuit adjusts the switching frequency when the voltage on the switches being not zero that a non-zero voltage switch is occurred.

13. The integrated circuit controller as claimed in claim 1, further comprising:
    an internal bias circuit connected to an input voltage to provide the power source.

14. The integrated circuit controller as claimed in claim 1, wherein the switches are high-side switch and low-side switch respectively to serve as a half bridge inverter.

15. The integrated circuit controller as claimed in claim 1, wherein the switches inside the integrated circuit controller.

16. The integrated circuit controller as claimed in claim 1, wherein the control logic circuit receives the preheat signal for controlling the oscillator circuit.

17. The integrated circuit controller as claimed in claim 1, wherein the timing control unit comprises:
    a charge/discharge circuit connected to a capacitor to charge or discharge the capacitor, a discharge slop of the capacitor matching a slop of the decrease of a filament temperature of a lamp, the control circuit coupled to the charge/discharge circuit to control the charge/discharge circuit to charge or discharge the capacitor; and
    a compare circuit coupled to the charge/discharge circuit to receive a voltage signal on the capacitor and having a first threshold voltage to compare the voltage signal on the capacitor with the first threshold voltage for timing control and providing the preheat signal.

18. The integrated circuit controller as claimed in claim 17, wherein the compare circuit generates the preheat signal when the voltage signal on the capacitor is lower than the first threshold voltage.

19. The integrated circuit controller as claimed in claim 17, wherein the compare circuit disables the preheat signal to stop preheating the filament when the voltage signal on the capacitor is higher than the first threshold voltage.

20. The integrated circuit controller as claimed in claim 17, wherein the compare circuit has a second threshold voltage to compare the voltage signal on the capacitor with the second threshold voltage for providing an ignition signal when the voltage signal on the capacitor is higher than the first threshold voltage and lower than the second threshold voltage, and the control logic circuit receives the ignition signal for igniting the lamp.

21. The integrated circuit controller as claimed in claim 20, wherein the first threshold voltage is lower than the second threshold voltage.

22. The integrated circuit controller as claimed in claim 20, wherein the control logic circuit controls the oscillator circuit to generate the oscillation signal with a minimum frequency limit for sweeping down the switching frequency until a minimum frequency in response to the ignition signal.

23. The integrated circuit controller as claimed in claim 22, wherein the ignition signal is disabled when the voltage signal on the capacitor is higher than the second threshold voltage, and the switching frequency is at the minimum frequency.

24. The integrated circuit controller as claimed in claim 20, wherein once the lamp failure to ignite a failure ignition protect is acted after the ignition signal disappears.

25. The integrated circuit controller as claimed in claim 17, wherein the control logic circuit has a threshold voltage and receives a feedback signal from a feedback control circuit of the ballast for an over voltage protection, the control logic circuit disables the oscillator circuit and controls the control circuit to discharge the capacitor once the feedback signal is higher than the threshold voltage of the control logic circuit.

26. The integrated circuit controller as claimed in claim 1, wherein the timing control unit comprises a timing control circuit for generating the preheat signal.

\* \* \* \* \*